(12) United States Patent
Ridgway

(10) Patent No.: US 12,631,255 B1
(45) Date of Patent: May 19, 2026

(54) LOCOMOTIVE DIESEL ENGINE POWER ASSEMBLY CYLINDER HEAD SEAT RING GASKET

(71) Applicant: MPRC PRODUCTS LLC, Cedar Rapids, IA (US)

(72) Inventor: Robert Ridgway, Northbrook, IL (US)

(73) Assignee: MPRC PRODUCTS LLC, Cedar Rapids, IA (US)

( * ) Notice: Subject to any disclaimer, the term of this patent is extended or adjusted under 35 U.S.C. 154(b) by 0 days.

(21) Appl. No.: 18/137,625

(22) Filed: Apr. 21, 2023

(51) Int. Cl.
*F16J 15/08* (2006.01)
*B61C 17/00* (2006.01)

(52) U.S. Cl.
CPC ........... *F16J 15/0818* (2013.01); *B61C 17/00* (2013.01)

(58) Field of Classification Search
CPC ...... F16J 15/08; F16J 15/0818; F16J 15/0881; F16J 15/0887; F16J 15/0893; F16J 15/3204; F16J 15/3236
See application file for complete search history.

(56) References Cited

U.S. PATENT DOCUMENTS

| | | | | |
|---|---|---|---|---|
| 2,560,092 A | * | 7/1951 | De La Mater | B65D 90/08 |
| | | | | 16/2.2 |
| 3,285,615 A | * | 11/1966 | Trbovich | F16J 15/025 |
| | | | | 277/639 |
| 4,561,662 A | * | 12/1985 | de Villepoix | F16J 15/0893 |
| | | | | 277/647 |
| 5,163,692 A | * | 11/1992 | Schofield | F16J 15/3236 |
| | | | | 277/467 |
| 5,238,136 A | * | 8/1993 | Kasugai | B60K 15/0406 |
| | | | | 277/649 |
| 5,531,460 A | * | 7/1996 | Stefansson | F16L 21/035 |
| | | | | 277/615 |
| 6,357,760 B1 | * | 3/2002 | Doyle | F16L 17/08 |
| | | | | 277/612 |
| 6,688,608 B2 | * | 2/2004 | Doyle | F16J 15/0881 |
| | | | | 277/612 |
| 2006/0237963 A1 | * | 10/2006 | More | F16J 15/0887 |
| | | | | 277/626 |
| 2009/0102141 A1 | * | 4/2009 | Wagner | F16J 15/025 |
| | | | | 277/650 |
| 2011/0291365 A1 | * | 12/2011 | Hirose | C08L 27/16 |
| | | | | 264/299 |
| 2012/0313027 A1 | * | 12/2012 | Welchner | F16J 15/062 |
| | | | | 277/549 |
| 2015/0069721 A1 | * | 3/2015 | Okafuji | F16J 15/0881 |
| | | | | 277/626 |
| 2020/0309267 A1 | * | 10/2020 | Tokunaga | F16J 15/3452 |

\* cited by examiner

*Primary Examiner* — Christine M Mills
*Assistant Examiner* — L. Susmitha Koneru
(74) *Attorney, Agent, or Firm* — Vedder Price P.C.

(57) ABSTRACT

A method, system and device for gasketing and sealing of a locomotive diesel engine power assembly's installation process. The method, system and device comprise a single metal and elastomeric combination seal or gasket having a plurality of individual elastomeric radial bumps or extensions on both contact surfaces specifically constructed for sealing the power assembly to the individual mating surfaces of the engine's block, main frame or crankcase. The plurality of radial bumps or extensions molded into both contact surfaces of the gasket at prescribed surface locations are selectively configured to withstand the critical assembly clamping pressure condition and the extreme temperature fluctuations experienced during the diesel engine operation process itself.

16 Claims, 10 Drawing Sheets

Head Seat Ring Modification

Figure 1: Locomotive Outline (prior art)

EMD Two-Stroke Diesel Engine

Power Assemblies Installed with Supporting Components

Power Assembly Head Seat Ring

Power Assembly Head Seat Ring

Cylinder Head Port Surface

Cylinder Exhaust Port

Head Seat

Intake Combustion Air Cavity, (Air Box)

Head Seat Ring Installed

EMD Power Assembly Installation

Cylinder hold down studs and crab plates

Power Assembly Installed and Torqued

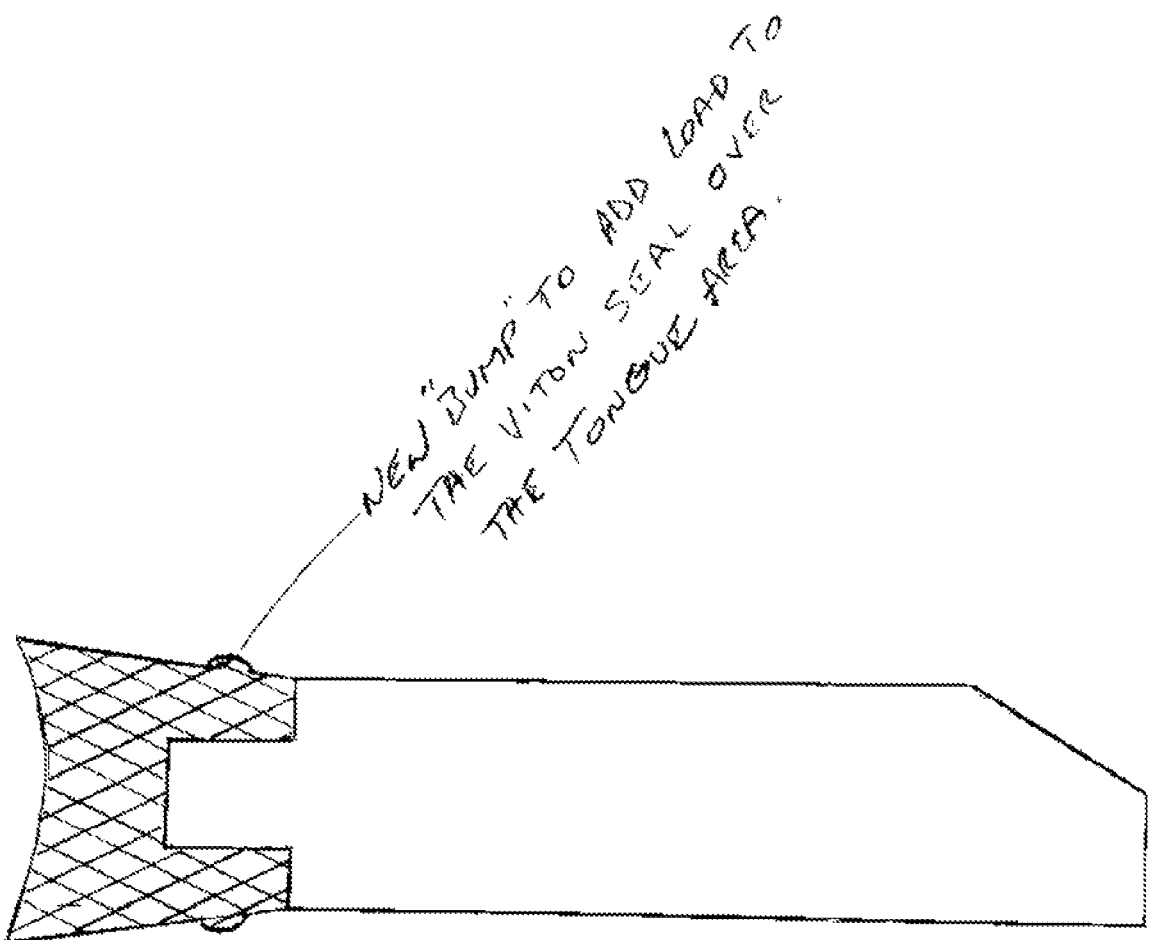
Figure 8: Head Seat Ring Modification

Figures 9A (uncompressed) and 9B (compressed)

Effect of Compressive Installation on Gasket Sealing

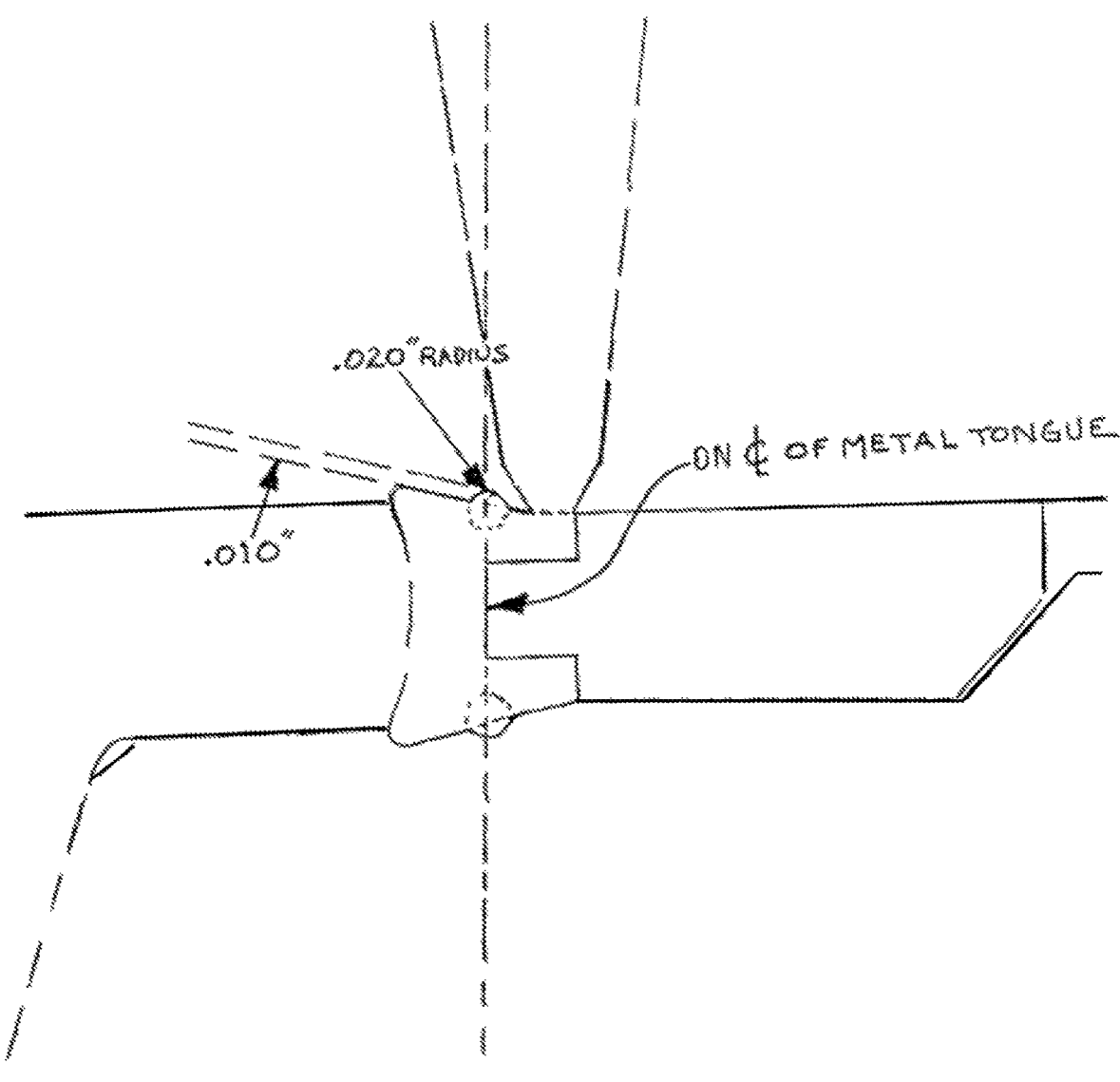
Figure 10: Ring Modification Details

LOCOMOTIVE DIESEL ENGINE POWER ASSEMBLY CYLINDER HEAD SEAT RING GASKET

TECHNICAL FIELD

The exemplary teachings herein pertain to a method, system and device for gasketing and sealing of each of a locomotive diesel engine's individual power assemblies as part of the repair, rebuild and/or overhaul installation process. Specifically, the present disclosure relates to a singular metal gasket having an elastomeric component specifically constructed for sealing the power assembly onto the mating surfaces between the cylinder head itself and the engine crankcase, main frame or block.

BACKGROUND

Typically, most diesel/electrical locomotives have a power generation source assembled into the locomotive to generate the electrical power required to drive the traction motors found on each of the multiple wheel sets. This power source has in the past been comprised of only two diesel engine configurations based on the combustion cycle, the two stroke Electro-Motive Division of General Motors, (EMD), and the four stroke General Electric Transportation System, (GETS). This unique and significant difference in the combustion cycle specifically defines the required installation process and components of these two diesel engines individual and multiple power assemblies.

The EMD locomotive diesel engine (see prior art FIG. 1) has multiple but separate and individual power assemblies, typically being 8, 12, 16 or 20 cylinders per this two-stroke diesel engine's Vee block arrangement. The power assemblies for a typical EMD 16 cylinder engine are assembled in groups of four, eight total on each bank of the engine's 45 degree Vee block (see prior art FIG. 2), along with all the supporting components, such as the camshafts, camshaft bearings, rocker arms, valve bridges, fuel injectors, fuel lines, and mechanical linkage (see prior art FIG. 3), and are all generally "splash" lubricated and cooled with the engine's pressurized lubricating oil that is directed to each of the power assemblies located inside the engine's cylinder head support frame assembly.

The two-stroke power assemblies are distinctly designed and constructed to be installed individually into the engine's cylinder head support frame cavity, (or top deck enclosure), with a metal and elastomer composite ring or gasket which prevents the internal splash lubrication inside the top deck enclosure from entering the liner cavity. This metal sealing component assembled between the mating surfaces of the cylinder head and the engine block is commonly referenced to as a cylinder head seat ring or gasket (see prior art FIGS. 4A and 4B).

A typical locomotive diesel engine two-stroke block/main frame/crankcase being prepped for the installation of the power assemblies with the installation head seat ring in the proper location is shown in FIG. 5. The power assembly being assembled into the engine's block, main frame, or crankcase with the head seat ring in the proper location is shown in FIG. 6. The power assembly assembled with the installation crab plates and studs properly torqued to permanently fix the power assembly in place during the engine operation is shown in FIG. 7.

The power assembly head seat ring is installed onto each of the engine block's "head pot" surfaces prior to the power assembly installation, as shown in Figure S. The Power Assembly ("PA") is then lowered into the engine block with the cylinder head onto and through the head seat ring completing the sealing of the PA to the engine block, as shown in FIG. 6. The power assembly is then torqued to the prescribed ft-lbs with "crab plates" to ensure that each of the power assemblies is fixed and unmoving, as shown in FIG. 7.

The two stroke engine head seat ring is composed of an inner metal ring with an elastomeric outer ring with the specific purpose to seal/prevent/obstruct any and all oil intrusion from the top deck enclosure cavity into the cylinder liner intake combustion air cavities, commonly known as the air box, and cylinder exhaust passageways, leading to a common occurrence referenced as exhaust souping.

The ring/elastomer composite head seat ring gasket must have flat sealing surfaces on both the cylinder head and on each of the engine block's individual head pots. The location of the exhaust port in relation to the Vee of the engine block significantly contributes to the durability and performance of the head seat ring especially that ring section that is exposed to higher operating exhaust temperatures than the remaining portions of the ring due strictly to the resultant exhaust stream gas flow from the combustion chamber through the cylinder head into the exhaust chamber/passageway leading to and entering the exhaust manifold. These higher exhaust temperatures have in the past resulted in ring warpage and subsequent leakage contributing to "oil souping or wet stack" thus having a direct effect on the power assembly's durability and service performance on the locomotive diesel engine.

Engine composite rings or gaskets have evolved over the last few years in an attempt to remedy many past design and performance imperfections including both dimensional changes as well as material or chemical composition. However, exhaust or oil souping was still a common problem.

SUMMARY

The exemplary method(s), system(s) and device(s) disclosed herein comprise a unique combination of dimensional configuration(s) and material composition(s) that will greatly improve the diesel engine power assembly head seat ring or gasket's sealing integrity and extend the locomotive's service life until the next consequential engine overhaul occurs, wherein the power assembly head seat rings are removed and renewed with a new gasket. The head seat ring of the present disclosure is intended to achieve a one million mile service life.

The head seat ring of the present disclosure comprises mechanical, dimensional, and chemical composition features that contribute to the overall improved durability performance of the head seat ring thus promoting longer operational life and greater reliability from leakage failures, (souping). These mechanical, dimensional and material chemical composition features include a) a material composition which includes a calculated and significant percentage of organic and chemical fillers that are combined with the most compatible derivative of the current Viton™ (trademark of The Chemours Company FC, LLC of Wilmington DE) elastomer chemistry properties, and will also enhance the resistance to compression set, especially to hold and maintain the new configuration dimensions and profile and to provide additional resistance to heat stress and degradation for the observed higher operating exhaust temperatures, and b) the addition of the current elastomeric material coloration additive (material/chemistry) that in combination with the modified Viton® chemistry composition will also promote an increase in the compression and heat stress resistance required for long term durability.

The present disclosure relates to an improved design of a locomotive diesel engine power assembly cylinder head seat ring by creating an expanding opposing lip design. To increase load mechanically. "bump rings" are added to increase mechanical loading over the interior tongue upon compression. This design will also aid in removal once load is removed from the opposing flange. The locomotive diesel engine power assembly cylinder head seat ring of the present disclosure increases the sealing integrity of this severe gasketing application and provides a significant improvement in extending the operational service life of the locomotive diesel engine.

Accordingly, it is an objective hereof to provide a method, system and device for a composite ring/gasket dimensional profile configured and shaped to prevent fluid material to flow into the cylinder liner cavity and to provide additional clamping pressure on the ring/gasket profile to increase the sealing effect, (compression set resistance).

It is another objective hereof to provide a method, system and device in which the material composition includes a calculated and significant percentage of organic and chemical fillers that are combined with the most compatible derivative of the current Viton® elastomer chemistry properties and will also enhance the resistance to compression set, (especially to hold and maintain the new configuration dimensions and profile), and to provide the additional resistance to heat stress and degradation for the observed higher operating exhaust temperatures.

Additional objectives, advantages and features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

FIG. 8 is an enlarged cross-sectional view of the seal of the present disclosure in an uncompressed state.

FIG. 10 is an enlarged cross-sectional view of the seal of the present disclosure shown in position for use.

DETAILED DESCRIPTION

The following description refers to numerous specific details which are set forth by way of examples to provide a thorough understanding of the relevant method(s), system(s) and device(s) disclosed herein. It should be apparent to those skilled in the art that the present disclosure may be practiced without such details. In other instances, well known methods, procedures, components and/or hardware have been described at a relatively high-level, without detail, in order to avoid unnecessarily obscuring aspects of the present disclosure. While the description refers by way of example to diesel engine cylinder head seat ring or gaskets and the installation and use thereof, it should be understood that the method(s), system(s) and device(s) described herein may be used in any situation where similar gaskets are needed or desired.

FIG. 8 illustrates the seal design of the present disclosure having a modification to the elastomeric portion of the head seat ring which adds a plurality of additional surface "bumps" or radial extensions on both upper and lower surfaces on the complete diameter of the elastomeric portion at a prescribed location on the head seat ring's contact surfaces in order to significantly increase the sealing capability, thereby adding more compressive tension into and upon the internal tongue portion of the metal ring which in effect increases the sealing capability of this area, and additionally to the outer elastomeric extrusion, extension or configuration.

Figure 1:
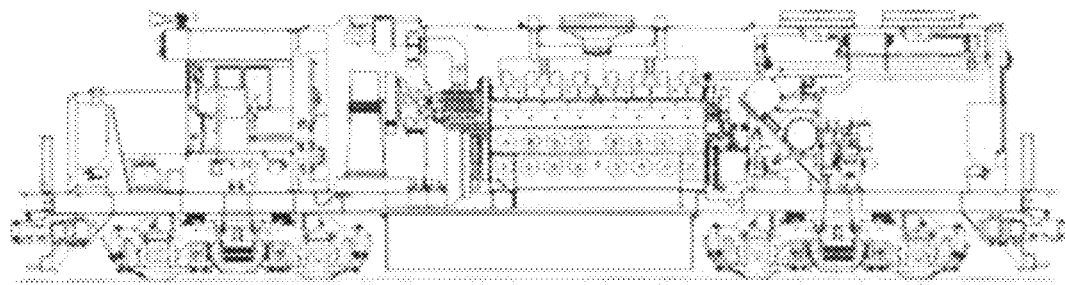
FIG. 1 is diagram of a prior art EMD locomotive arrangement.
Figure 2:
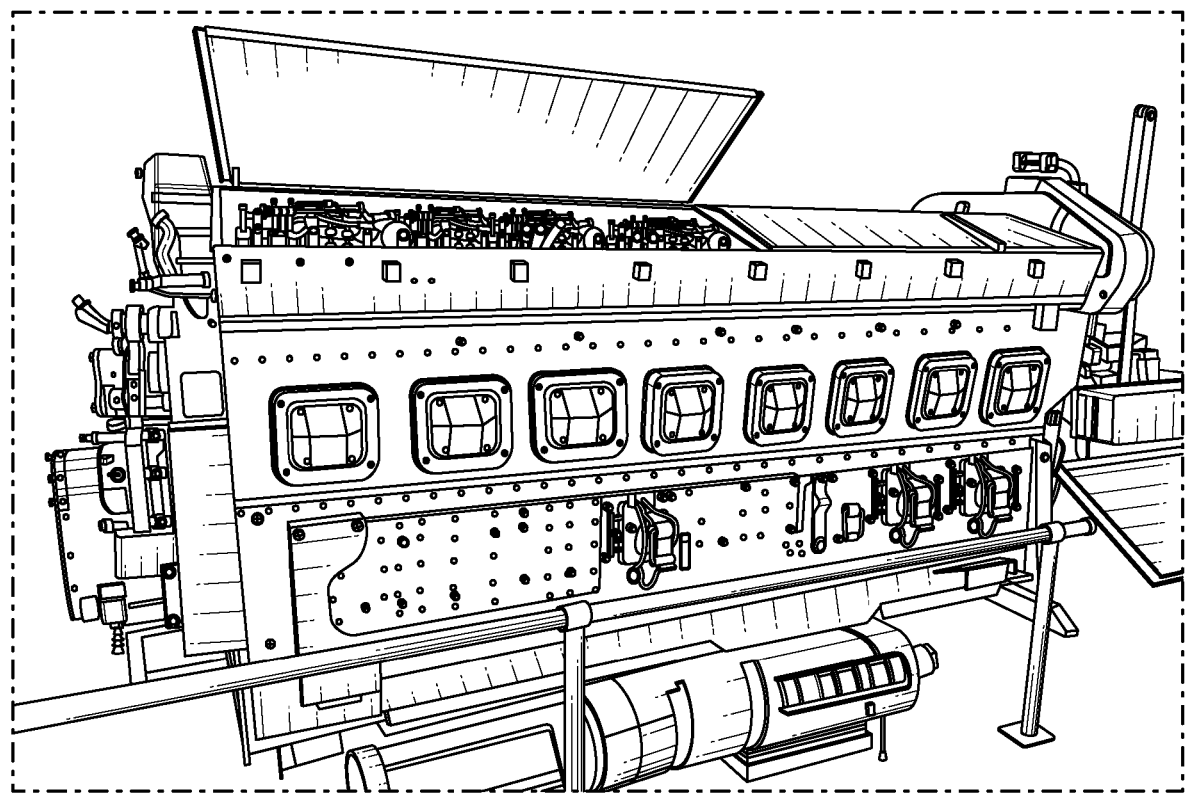
FIG. 2 is a picture of a prior art EMD two-stroke diesel engine with cylinder head cover and support frame assembly for a sixteen cylinder engine.
Figure 3:
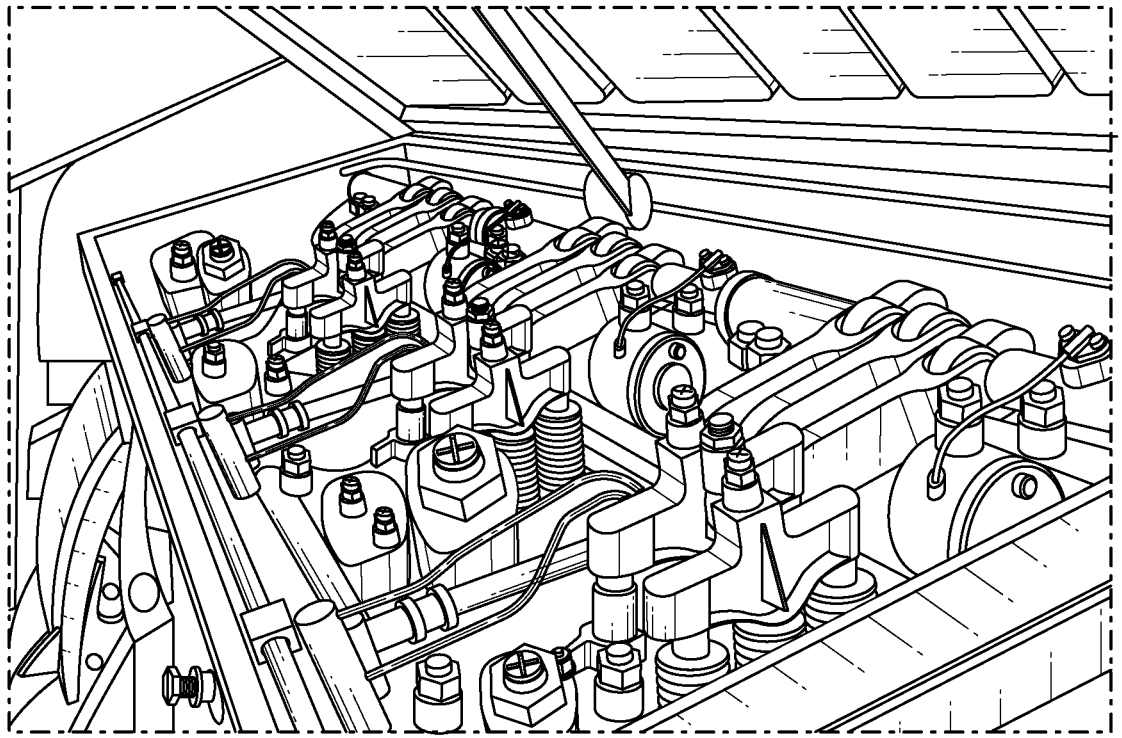
FIG. 3 is a picture of a prior art cylinder head cover assembly with assembled power assemblies and components.
Figure 4A:
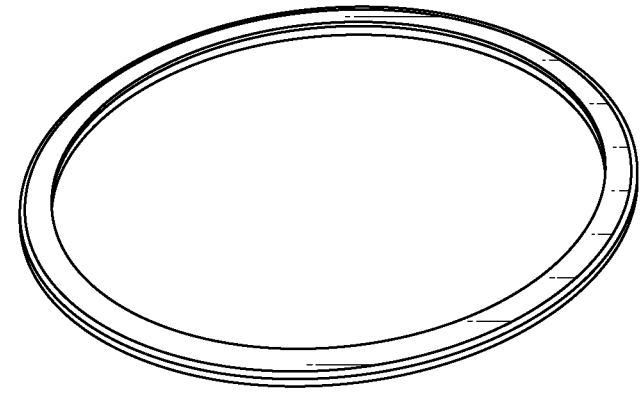
FIGS. 4A and 4B are prior art pictures illustrating a head seat ring.
Figure 4B:
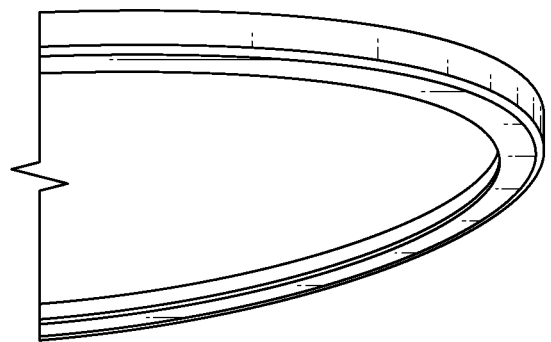
Figure 5:
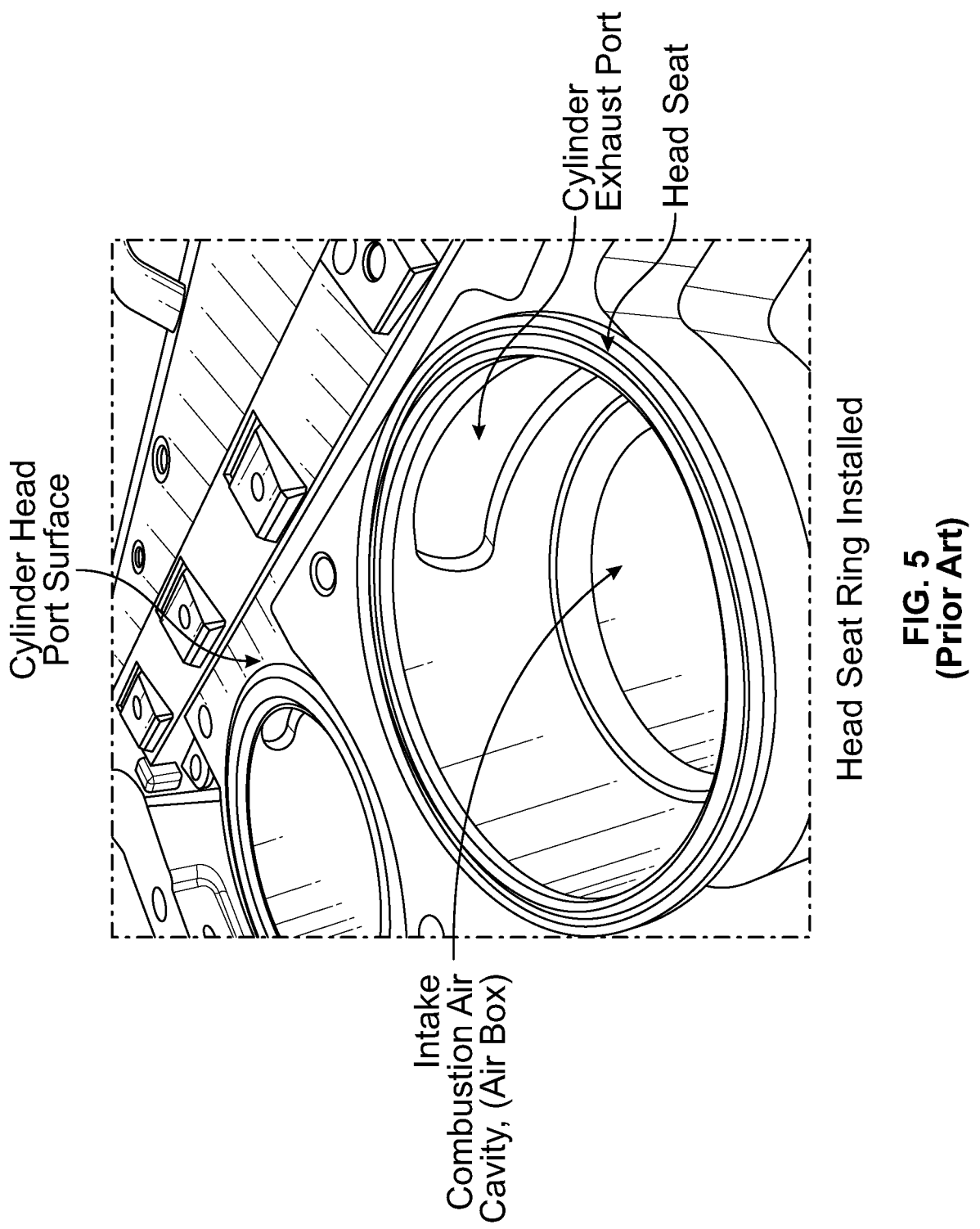
FIG. 5 is a prior art picture illustrating a head seat ring installation.
Figure 6:
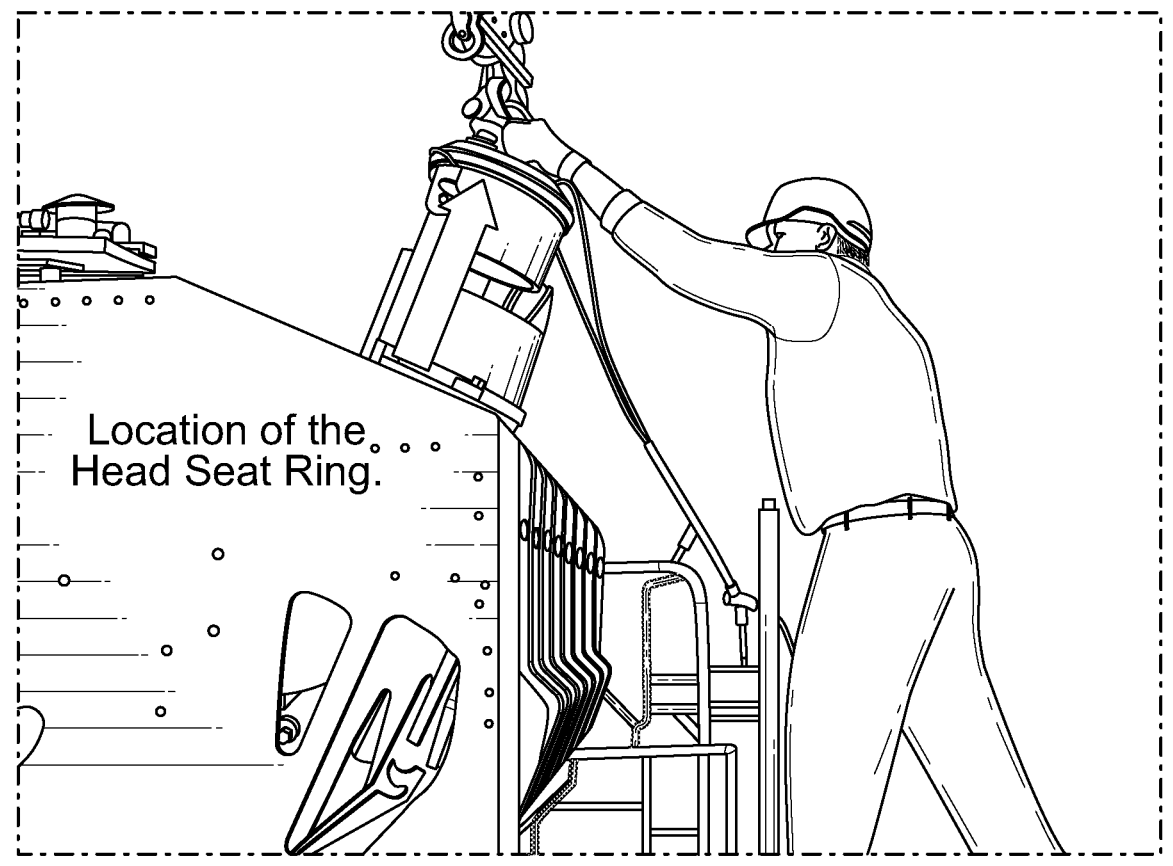
FIG. 6 is a prior art picture illustrating the engine's power assembly during installation.
Figure 7:
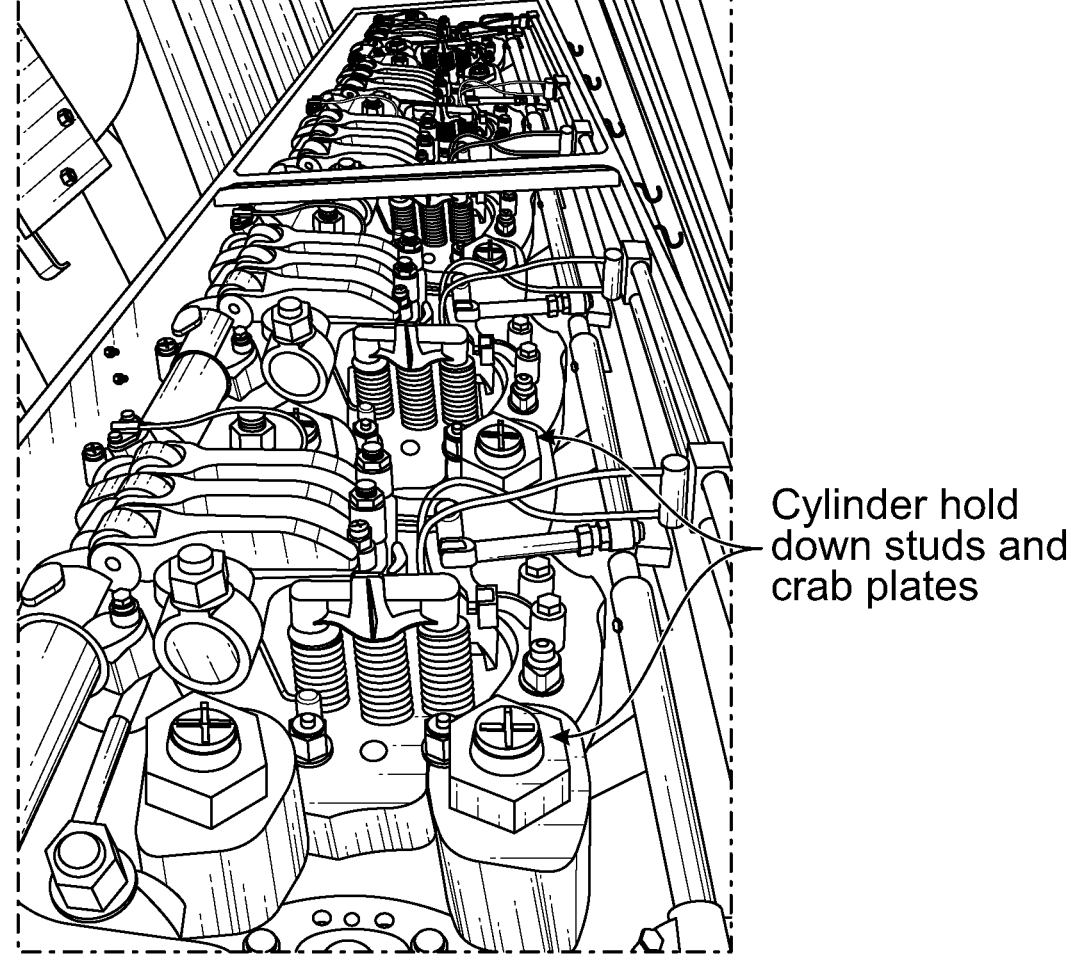
FIG. 7 is a prior art picture illustrating the engine's power assembly installed and torqued in place.
Figures 9A, 9B:
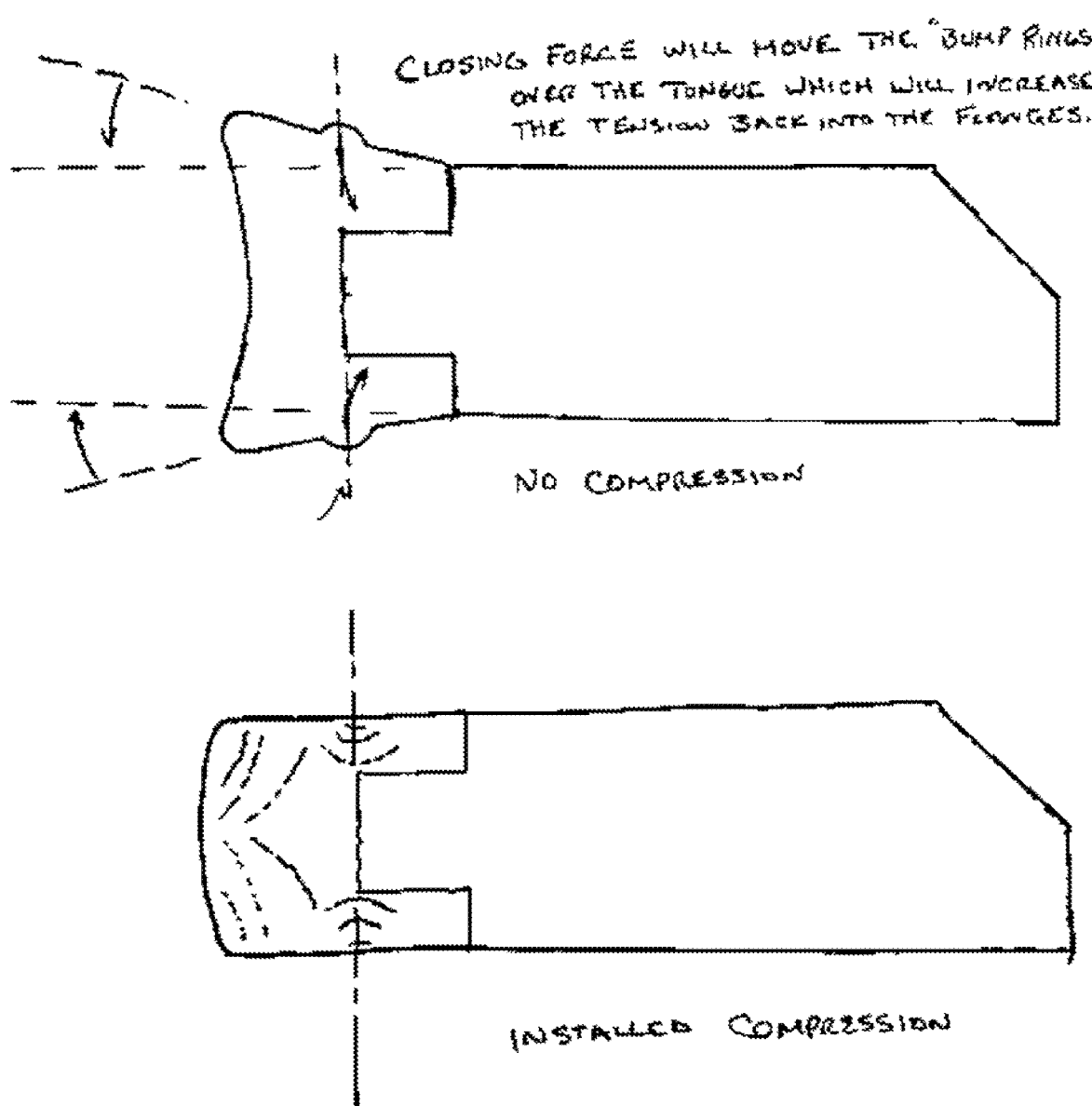
FIGS. 9A and 9B are enlarged cross-sectional schematic diagrams of the seal present disclosure in the uncompressed (9A) and compressed (9B) state.

FIGS. 9A (uncompressed) and 9B (compressed) illustrate the compressive effect (in FIG. 9B) of the power assembly installation on the elastomeric portion of the head seat ring, showing the various sections of the elastomer movement under compression, thereby providing the increased sealing capability upon the internal tongue portion of the metal ring component, and the increased sealing capability to the outer elastomeric extrusion, extension or configuration.

FIG. 10 illustrates the seal design modification details of the additional surface "bumps" or radial extensions on both upper and lower surfaces on the complete diameter of the elastomeric portion at a prescribed location on the head seat ring's contact surfaces. As can be seen in FIGS. 8-10, the elastomeric portion of the head seat ring mates with the tongue portion of the metal portion of the head seat ring. The outer ends of the elastomer portion extend upward and away from the metal portion at an angle. Further, the outer edge of the elastomeric portion forms a generally concave shape, as illustrated in FIG. 9A. The added bump portions are located at least partially over the metal tongue portion, preferably located centrally, i.e., along a center line of a plane extending vertically from the outer vertical edge of the tongue portion, as can be seen in FIG. 10. As illustrated in FIG. 9B, when the elastomeric portion is compressed the bumps flatten out, with the flow of material creating additional sealing force around the metal tongue portion. Additionally, the upwardly sloping ends of the elastomeric portion also flatten out, with the flow of material creating additional sealing force at the outer edge of the elastomeric portion, which when compressed assumes a generally convex shape, as shown in FIG. 9B, thereby adding a high degree of tension into the flange faces to insure proper loading. As illustrated in FIG. 10B, the bumps are preferably 0.010 inches in height at their center, and preferably have a 0.020 inch radius. These dimensions may vary by approximately +/−0.005".

The gasket material composition and durometer can be of elastomeric composition with the appropriate durometer required for these materials and the fluid sealing application. For example, the gasket may be made of Viton® F-type family of fluoroelastomers, such as the Viton™ F-605C fluoroelastomer, with a 75 to 80 durometer, preferably 80 durometer, along with the addition of a percentage of organic and chemical fillers for example 5% to 15% organic and chemical fillers by weight of the material mix.

The organic and chemical fillers include: silica, barium sulfate, calcium carbonate, zinc sulphide, wollastone, and the like, up to 17% by weight; core activators such as calcium hydroxide, magnesium oxide, calcium oxide, up to 8% by weight; cross-linking chemical such as bisphenol at approximately 2% by weight; process aid (carnauba wax at 1%); and/or colorant (blue, yellow, red, and the like) at 1% by weight.

While the embodiment(s) disclosed herein are illustrative of the structure, function and operation of the exemplary method(s), system(s) and device(s), it should be understood that various modifications may be made thereto with depart-ing from the teachings herein. Further, the components of the method(s), system(s) and device(s) disclosed herein can take any suitable form, including any suitable material or other components capable of adequately performing their respective intended functions, as may be known in the art.

While the foregoing discussion presents the teachings in an exemplary fashion with respect to the disclosed method(s), system(s) and device(s) for providing a sealing gasket between the engine's power assembly and the loco-motive diesel engine's block, main frame or crankcase assembly, it will be apparent to those skilled in the art that the present disclosure may apply to other method(s), system(s) and device(s) utilizing the disclosed sealing tech-nologies. Further, while the foregoing has described what are considered to be the best mode and/or other examples, it is understood that various modifications may be made therein and that the subject matter disclosed herein may be implemented in various forms and examples, and that the method(s), system(s) and device(s) may be applied in numerous applications, only some of which have been described herein.

What is claimed is:

1. A power assembly installation head seat ring or gasket comprising:
   a structural metal ring, wherein the structural metal ring includes a tongue having an outer edge at an outer circumferential surface of the metal ring;
   an outer elastomeric portion surrounding the tongue of the structural metal ring;
   wherein the elastomeric portion includes an upper end and a lower end;
   wherein in an uncompressed state, the upper end slopes upward and outward and the lower end slopes down-ward and outward from an elastomeric inner edge of the elastomeric portion at the outer circumferential surface of the metal ring towards an elastomeric outer edge of the elastomeric portion;
   the elastomeric outer edge of the elastomeric portion having a concave surface in the uncompressed state and a convex surface in a compressed state; and
   a radial bump or extension on at least one of an upper contact surface and a lower contact surface of the elastomeric portion, wherein the radial bump or exten-sion when under compression provides a sealing force to the tongue.

2. The head seat ring or gasket of claim 1, wherein the radial bump or extension is located along a centerline extending along the outer edge of the tongue.

3. The head seat ring or gasket of claim 1, wherein the elastomeric portion comprises a fluoroelastomer material, and a percentage of organic and chemical fillers added to the fluoroelastomer material.

4. The head seat ring or gasket of claim 3, wherein the percentage of organic and chemical fillers added to the fluoroelastomer material is 10%+/−5%.

5. The head seat ring or gasket of claim 3, further comprising the addition of elastomeric yellow coloration additive in the fluoroelastomer material.

6. The head seat ring or gasket of claim 3, wherein the fluoroelastomer material has a durometer of 75-80.

7. The head seat ring or gasket of claim 1, wherein the radial bump or extension is formed on both the upper contact surface and the lower contact surface of the elastomeric portion.

8. A locomotive diesel engine power assembly installation head seat ring or gasket comprising:
   a metal portion having a tongue, wherein the tongue has an outer edge at an outer circumferential surface of the metal portion, and an elastomeric portion surrounding the tongue, wherein the elastomeric portion has a dimensional profile configuration and shape having at least one raised bump for providing clamping pressure points on contact surfaces of the tongue to increase compression resistance between a cylinder head and an engine block's assembly surface, and
   wherein the dimensional profile configuration and shape having upwardly and outwardly sloping ends from an elastomeric inner edge at the outer circumferential surface of the metal portion and forming a concave edge in an uncompressed state and a convex edge in a compressed state.

9. The gasket of claim 8, wherein the elastomeric portion incorporates a percentage of organic and chemical filler additive to an elastomeric material to increase the energy retention and compression resistance property of the gasket.

10. The gasket of claim 9, wherein the elastomeric mate-rial is characterized by an addition in elastomeric coloration additive to complement the increase of the energy retention and compression resistance property of the gasket.

11. A method of sealing between a cylinder head and an engine block's assembly surface, comprising the steps of:
   providing a gasket having a metal ring portion defining a tongue having an outer edge at an outer circumferential surface of the metal ring, and an elastomeric portion attached to the tongue;
   forming a bump on at least one surface of the elastomeric portion;
   forming upwardly and outwardly sloping ends from an elastomeric inner edge of the elastomeric portion at the outer circumferential surface of the metal ring;
   an elastomeric outer edge of the elastomeric portion forming a concave outer edge in an uncompressed state; and
   compressing the gasket such that the sloping ends com-press to transform the concave outer edge into a convex outer edge to provide an outward sealing force at the elastomeric outer edge and the bump compresses to provide a sealing force to the tongue.

12. The method of claim 11, further comprising the step of forming the elastomeric portion of the gasket from a fluoroelastomer material.

13. The method of claim 12, further comprising the step of adding a percentage of organic and chemical fillers to the fluoroelastomer material.

14. The method of claim 12, further comprising the step of adding an amount of an elastomeric yellow coloration additive from in the fluoroelastomer material.

15. The method of claim 12, wherein the fluoroelastomer material has a durometer of 75-80.

16. The method of claim 13, wherein the step of adding the percentage of organic and chemical fillers to the fluoroelastomer material comprises adding 5% to 15%.

\* \* \* \* \*